United States Patent
Ahrens

(10) Patent No.: US 7,181,111 B2
(45) Date of Patent: Feb. 20, 2007

(54) APPARATUS FOR SPLICING OPTICAL FIBERS

(75) Inventor: Robert George Ahrens, Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 148 days.

(21) Appl. No.: 10/651,064

(22) Filed: Aug. 28, 2003

(65) Prior Publication Data

US 2005/0047725 A1 Mar. 3, 2005

(51) Int. Cl.
*G02B 6/26* (2006.01)

(52) U.S. Cl. ........................................ 385/52

(58) Field of Classification Search ................ 385/95, 385/96, 97
See application file for complete search history.

(56) References Cited

U.S. PATENT DOCUMENTS

| | | | | |
|---|---|---|---|---|
| 5,339,380 A | * | 8/1994 | Wysocki et al. | 385/136 |
| 5,623,570 A | | 4/1997 | Krause et al. | 385/95 |
| 5,689,605 A | | 11/1997 | Cobb et al. | 385/135 |
| 5,758,000 A | * | 5/1998 | Zheng | 385/97 |
| 5,896,486 A | | 4/1999 | Burek et al. | 385/135 |
| 6,186,675 B1 | * | 2/2001 | Ruegenberg | 385/96 |
| 6,520,689 B2 | * | 2/2003 | DeMartino et al. | 385/98 |
| 6,587,621 B2 | | 7/2003 | Weaver | 385/39 |
| 6,594,434 B1 | | 7/2003 | Davidson et al. | 385/135 |
| 2002/0094175 A1 | * | 7/2002 | Oskarsson | 385/88 |
| 2002/0176672 A1 | * | 11/2002 | Stowe | 385/96 |
| 2003/0002827 A1 | * | 1/2003 | Ozawa et al. | 385/96 |
| 2004/0057680 A1 | * | 3/2004 | Hersoug et al. | 385/97 |
| 2004/0071414 A1 | * | 4/2004 | Liang et al. | 385/96 |
| 2004/0165841 A1 | * | 8/2004 | Fernald et al. | 385/96 |

* cited by examiner

*Primary Examiner*—Sarah Song

(57) ABSTRACT

An apparatus for aligning the cores of the two optical waveguides. The apparatus includes a control loop for receiving an aligning signal launched through the core of one of the optical waveguides. The control loop may effectuate the aligning signal to propagate through the cores of the optical waveguides. The control loop may include a detector for generating a detecting signal in response to detecting the aligning signal. Moreover, the control loop may include a machine-vision system for generating a manipulation signal in response to the detecting signal. The control loops may also include a controller for physically aligning one of the optical waveguides with respect to the other optical waveguide in response to the manipulation signal. The controller may perform the physically alignment by means of a robotic tool. The apparatus may also include a means for splicing the optical waveguides.

7 Claims, 3 Drawing Sheets

APPARATUS FOR SPLICING OPTICAL FIBERS

FIELD OF THE INVENTION

This invention relates to the field of communications, and more particularly to optical fiber.

BACKGROUND OF THE INVENTION

Optical waveguides, such as optical fibers, are employed in the transport of optical signals. Optical fibers typically comprise a core surrounded by a cladding. If the refractive index of the core exceeds the refractive index of the cladding, an optical signal launched into the core may propagate there through, remaining contained within the length of the core of the fiber.

With the growth of high-speed communications, a need exists for splicing optical fibers together. For the purposes of the present disclosure, a splice refers to the assembly of a fused joint between two or more optical fibers. The need for splicing arises in extending the length of an optical fiber(s), in creating a mode converter(s), and in coupling an optical fiber(s) to devices, such as a repeater.

A variety of techniques are known for splicing optical fibers together. One such a method is fiber fusion. Fiber fusion splicing involves aligning the cores of two optical fiber ends and performing a heating step to fuse the optical fibers together. Presently, apparatus supportive of fiber fusion splicing either blindly aligns the cores by estimating their positions from the known positions of the claddings, or aligns the cores by maximizing the transmission of light as measured through the splice region. These techniques, however, may not produce an ideal result if the optical fibers have non-concentric geometries or complex mode profiles.

Therefore, a need exists for an apparatus to splice two or more optical fibers, wherein at least one of the optical fibers may have a non-concentric geometry or complex mode profile.

SUMMARY OF THE INVENTION

The present invention provides an apparatus for aligning two or more optical waveguides. More particularly, the present invention provides an apparatus for aligning the cores of at least two optical waveguides and for splicing these aligned waveguides. It should be noted that one or more of these optical waveguides might comprise an optical fiber having a non-concentric geometry and/or complex mode profile.

In one embodiment, the apparatus of the present invention may comprise a control loop for aligning the cores of the two optical waveguides. The control loop may receive an aligning signal launched through the core of one of the optical waveguides from a light source. The control loop may effectuate the aligning signal to propagate through the cores of the optical waveguides. The control loop may comprise a detector, such as a camera, an image sensor and a charge couple device, for generating a detecting signal in response to detecting the aligning signal propagating through the core of at least one of the waveguides. Moreover, the control loop may comprise a machine-vision system for generating a manipulation signal in response to the detecting signal. The control loop may also comprise a controller for physically aligning one of the optical waveguides with respect to the other optical waveguide in response to the manipulation signal. The controller may perform the physically alignment by means of a robotic tool. The apparatus may further comprise a means for splicing the optical waveguides, such as a fusion splicer, for example.

In another embodiment, the apparatus of the present invention may monitor the mode profile of at least one optical fiber. The monitoring of the mode profile may be performed at a cleaved waveguide end distal of the splice region utilizing feedback from an optical sensors, such as a video camera, for example. The mode profile of the resultant optical fiber may then be optimized according to a particular set of design criterion. Thereafter, the waveguides may be fused by active optical fiber splicing technique, for example.

BRIEF DESCRIPTION OF THE DRAWINGS

The present invention will be better understood from reading the following description of non-limiting embodiments, with reference to the attached drawings, wherein below.

Figure 1:
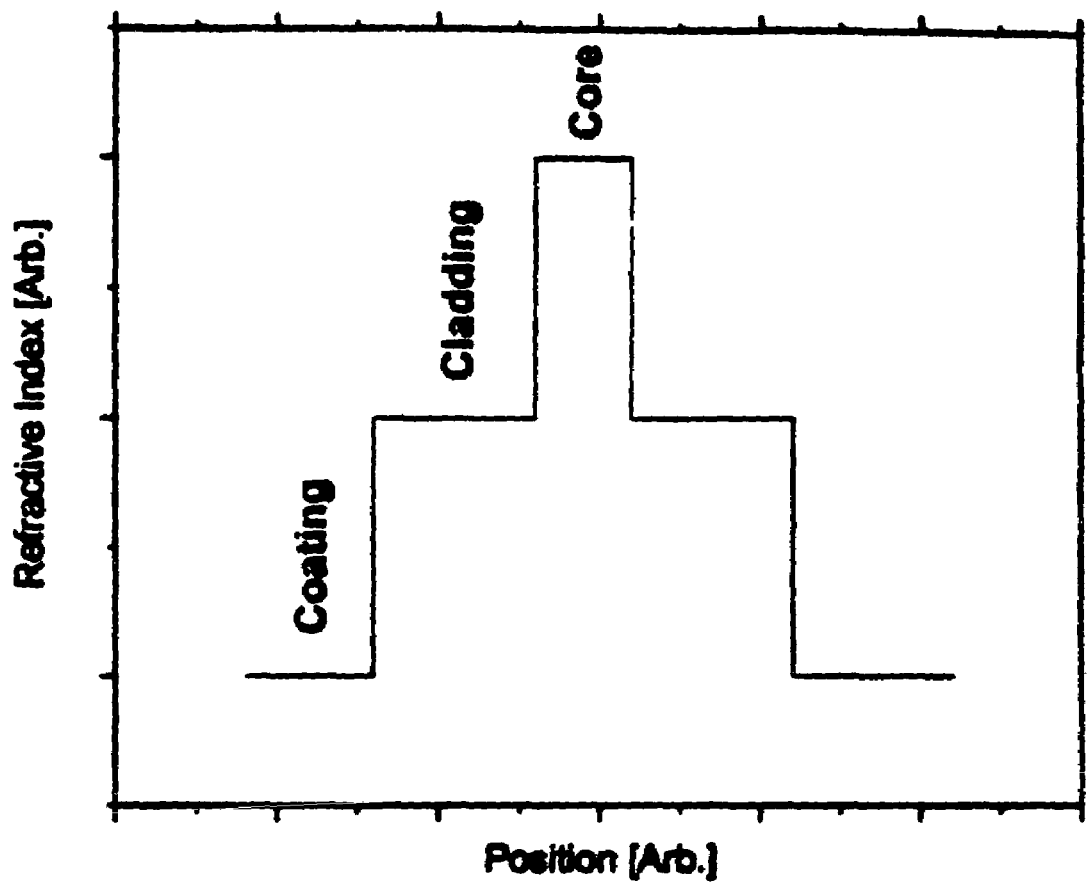
FIG. 1 depicts a refractive index profile of a first known optical fiber design.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Automated passive splicing machines are presently designed using certain assumptions regarding the geometries of the optical fibers to be spliced. These automated passive splicing machines may be programmed to splice fibers having concentric cores and claddings. Thusly, automated passive splicing machines may splice fibers with their cores and claddings sharing a common central axis. The task of splicing may, consequently, merely involve aligning the outer diameter of the two optical fibers prior to splicing. As a result, the loss attributed to fusion splices may be relatively low by providing two optical fibers having their cores and claddings concentrically aligned. Present automated passive splicing machines, however, have shortcomings if the cores and claddings are not concentric.

Various automated active splicing machine designs are known. One active alignment approach may be achieved by launching an optical signal through the core of a first optical fiber to be spliced. Both optical fibers may then be brought within close proximity to each other such that the light from first fiber is coupled into the second optical fiber. The second optical fiber's output end may be suitably coupled to a power meter. As such, the total transmitted power may be monitored. Iterative adjustments of the spatial position of one fiber to the other may be made until the monitored output power reaches a maximize level.

While the above active alignment approach has been used successfully, it too has a number of limitations because it relies on certain assumptions. For example, the optical signal used during active alignment may not be absorbed by the first or second optical fiber. This may be particularly relevant when using 1550 nm light to splice two erbium-doped optical fibers. The 1550 nm light may be absorbed by the erbium within the core of the first optical fiber. Consequently, the light coupled into the second fiber may be attenuated, thereby leading to a diminished transmitted power level of the signal at the monitoring power meter. Proper optical fiber alignment, however, may be achieved when the output signal may be minimized, though not zero. To avoid this issue, a signal wavelength may be selected that may not correspond to any inherent absorption peak in the optical fiber. Thusly, for erbium-doped fibers, a wavelength such as 1310 nm may be used. There are, however, drawbacks in selecting a wavelength other than the wavelength operationally intended for optical fiber. It is known that optical properties, such as coupling losses, may change with signal wavelength. Consequently, if a non-operational wavelength is chosen, the resulting fiber-to-fiber alignment may not result in a low loss splice at the operational wavelength.

Additionally, the active alignment approach described hereinabove presents other drawbacks if using non-standard optical fiber(s). Non-standard optical fiber may have cladding pumped geometries and pedestal geometries, for example. These pumped geometries and pedestal geometries may pose problems when attempting to actively align two or more fibers.

Referring to FIG. 1, a plot of the refractive index profile of an exemplary dual-clad cladding pumped optical fiber is shown. FIG. 1 shows the indices of refraction of the core, cladding and optical fiber coating of an exemplary non-standard optical fiber. In the case of the geometry depicted in FIG. 1, light may be guided by both the core and cladding of the optical fiber. The monitoring meter may detect incorrect transmitted power information if light is launched into the core and cladding of the second fiber while the two fibers are positioned with respect to each other. Consequently, use of this active alignment approach may not be most suitable for a non-standard optical fiber, such as, for example, a fiber having a refractive index profile illustrated in FIG. 1.

Figure 2:
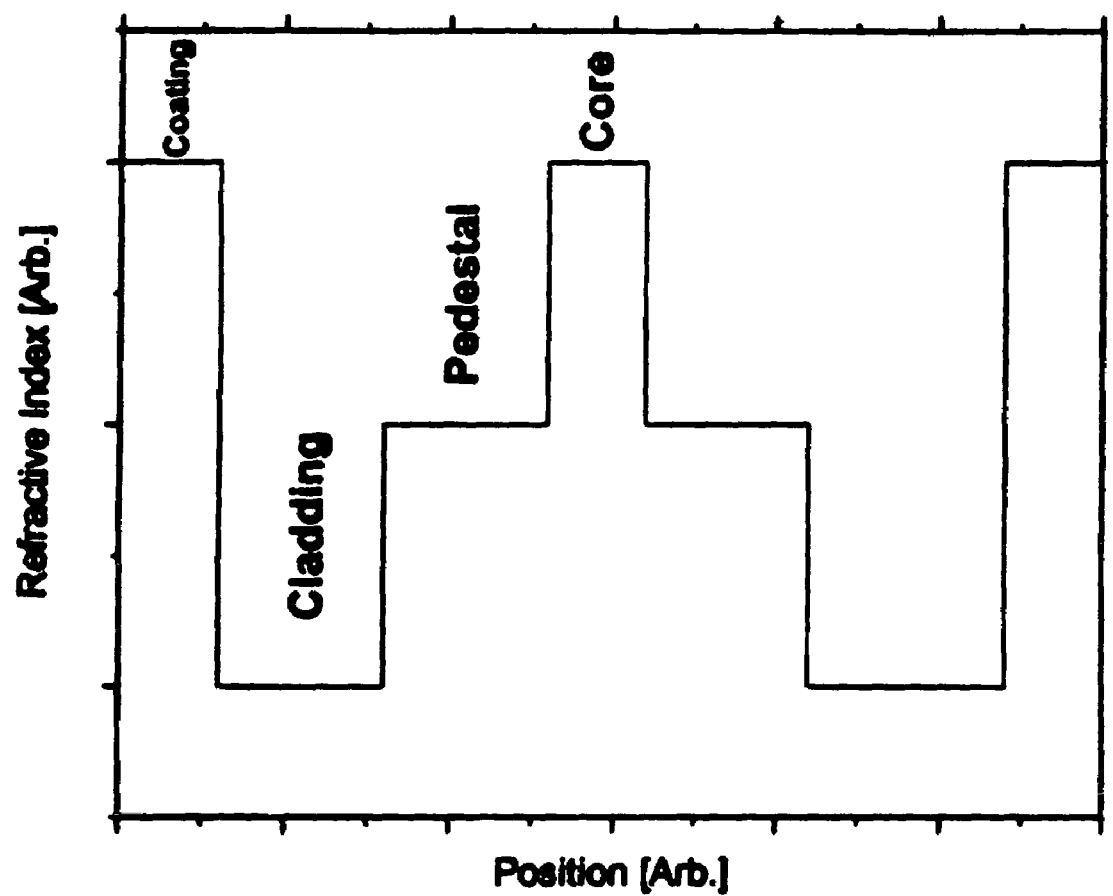
FIG. 2 depicts a refractive index profile of a second known optical fiber design.

Referring to FIG. 2, a plot of the refractive index profile of an exemplary optical fiber having a geometry containing a pedestal within the core is shown. As illustrated, the pedestal has a refractive index lower than the optical core, but higher than the optical cladding. Thus, an optical signal may be transmitted and guided within either the core or pedestal of the fiber. The active alignment approach detailed hereinabove, once again, may give rise to erroneous results if light is launched into the pedestal of the second fiber instead of the fiber's core.

It should be noted that the limitations of the hereinabove passive and active approaches might also appear where the optical core and cladding are not concentric within the fiber geometry. This issue arises when dealing with non-production fibers (e.g., research fibers) or dual core optical fibers. Much like non-standard optical fibers, the active alignment approach above may produce erroneous results because the light may not be properly launched into the fiber's core.

In view of the above, a need exists for an apparatus to splice two or more optical waveguides, where one or more may be non-standard, may have a non-concentric geometry and/or may have a complex mode profile. Consequently, the present invention provides an apparatus for aligning two or more optical waveguides. More particularly, the present invention provides an apparatus for splicing of two or more optical waveguides aligned according to a particular set of design criteria. These criteria may include an optimal alignment of the cores of the optical waveguides to be spliced.

Figure 3:
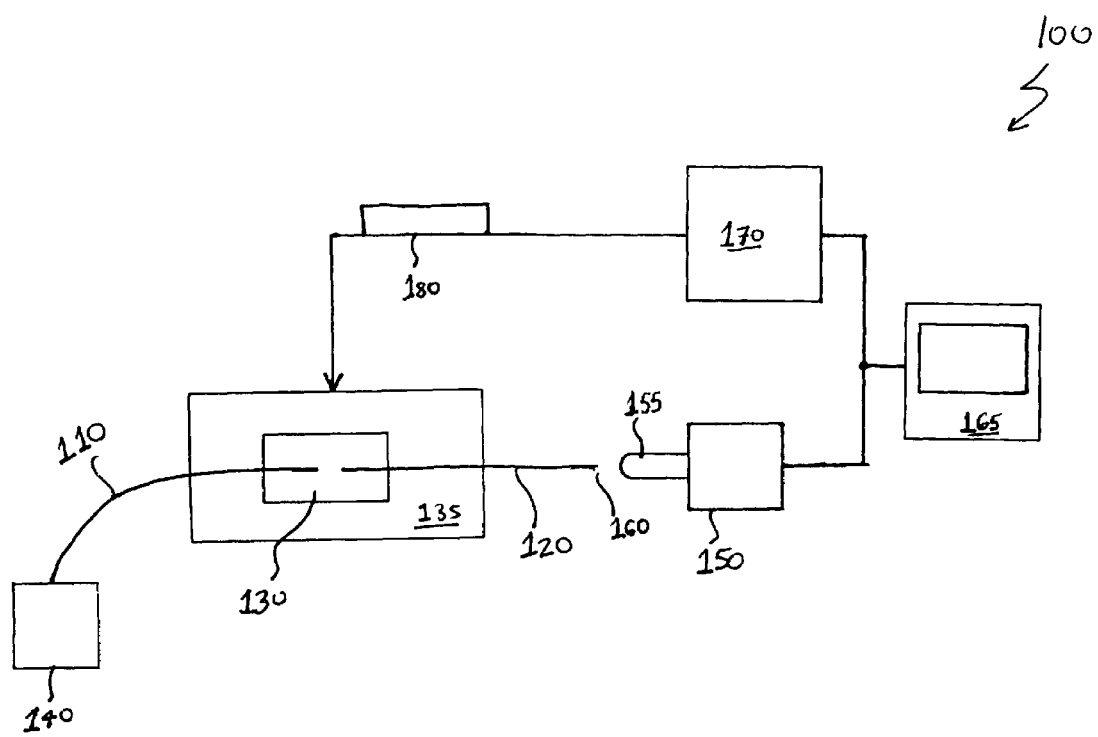
FIG. 3 depicts an embodiment of the present invention.

Referring to FIG. 3, an embodiment of the present invention is illustrated. Here, an apparatus 100 for aligning at least a first and a second optical waveguides, 110 and 120, and for splicing of these waveguides aligned according to a particular set of design criteria. Each optical waveguide may comprise an optical fiber having at least a core and a cladding. Moreover, at least one of the optical waveguides may comprise a non-concentric geometry and/or a complex mode profile.

Apparatus 100 comprises a support bed 135. Both waveguides, 110 and 120, are positioned on support bed 135, to facilitate the desired alignment. In one embodiment of the present invention, support bed 135 may also comprise means for splicing 130, which splices waveguides, 110 and 120, once their cores are aligned. It will be apparent to skilled artisans from the present disclosure that various alternatives are available to realize means for splicing 130, including, for example, a fusion splicer tool.

Apparatus 100 employs a light source 140. Light source 140 generates an aligning signal. Once at least first waveguide 110 is positioned on support bed 135, the aligning signal from light source 140 may be launched into the core of the first waveguide 110. By means of the inventiveness of apparatus 100, any wavelength(s) may be chosen for the aligning signal. It should be noted, however, that the selected wavelength should have single-mode characteristics when guided by the cores of waveguides 110 and 120. Light source 140 may be realized using a laser, a light emitting diode, or a light bulb.

Apparatus 100 also comprises a control loop for aligning the core of first waveguide 110 with respect to second waveguide 120. The control loop achieves this function in response to the original aligning signal. More particularly, the control loop aligns first waveguide 110 with respect to second waveguide 120 so that the aligning signal propagates in accordance with a particular set of design criteria. For example, the control loop may be designed to detect if the aligning signal is propagating through the core of waveguide 110 and exclusively into waveguide 120.

The control loop comprises a detector 150. Detector 150 detects whether the aligning signal propagating through the core of waveguide 110 and passes exclusively into the core of waveguide 120. More particularly, detector 150 generates a detecting signal in response to detecting the amount of the aligning signal that propagates through the core of waveguide 120. Detector 150 may be realized by various means, including, for example, an image sensor, TV camera, and/or charge couple device.

Coupled with detector 150 is a lens element 155. Lens element 155 comprises a focal point(s) or plane 160. The free end of second optical waveguide 120 should be positioned within focal point 160 of lens element 155. Consequently, the aligning signal propagating through at least the core of waveguide 110 may be received by detector 150 through lens element 155.

In one embodiment, a video monitor 165 may be coupled with detector 150. Video monitor 165 displays the aligning signal as received by detector 150—e.g., the detecting signal. Video monitor 165 may monitor the aligning signal by displaying any misalignment or misguiding in the manipulation of first waveguide 110 with respect to second waveguide 120. It should be noted that video monitor 165 may also include a computer system for tracking and storing the information displayed by video monitor 165 as well as the output of detector 150.

The control loop further comprises a machine vision system 170. Machine vision system 170 is coupled with the output of detector 150 so as to receive the detecting signal. Machine vision system 170 computes the degree of manipulation that may be necessary to physically align the cores of first and second waveguide, 110 and 120. Machine vision system 170 arrives at this computational result from the detecting signal. The computational result, in turn, is output from machine vision system 170 in the form of a manipulation signal.

The control loop of apparatus 100 further comprises a controller 180. Controller 180 physically aligns one of the optical fibers with respect to the other fiber in response to the manipulation signal. Controller 180 translates the manipulation signal into the physical repositioning of one waveguide with respect to the other waveguide. A feedback loop may also be included to reduce error in the physical repositioning the waveguide(s) by controller 180. The feedback loop allows for the continued repositioning of the waveguides until the aligning signal passes through the cores of waveguides, 110 and 120, according to the desired tolerances and design criteria. Controller 180 may perform the physical repositioning using any number of means, including a robotic tool, for example.

In one example, the control loop may operate according to the following sequence of steps. Detector 150 detects a misalignment between the cores of waveguides 110 and 120. In response, detector 150 generates a detecting signal corresponding to the degree of misalignment. Receiving the detecting signal, machine vision system 170 computes the degree of manipulation necessary to physically align the cores of waveguides 110 and 120 in the form of the manipulation signal. Controller 170, thereafter, translates the misalignment signal into the physical repositioning of one waveguide with respect to the other waveguide. The feedback loop allows for the continued repositioning of the waveguides until enables the original aligning signal to ultimately pass through the cores of both waveguides according to the desired design criteria.

Exemplary Embodiments

An apparatus for performing fiber fusion splicing may be augmented by using a monitoring camera to modify the relative position of the two fiber optic cores with respect to each other. The apparatus utilize a feedback loop to minimize the error in repositioning the fiber optic cores with respect to each other. One approach may consist of a conventional automated fusion splicer outfitted with a video camera having appropriate feedback circuitry that is connected electronically to the fusion splicer itself. In addition, a machine vision system may be coupled with a video monitor for viewing of the video camera signal by an operator.

As required, two or more optical fibers may be suitably placed into the apparatus for performing fiber fusion splicing. At least the first optical fiber may be coupled to an optical light source having a wavelength known to be single-moded when guided by the core of both the optical fibers. The free end of the second optical fiber may be placed directly at the focal point of the video cameral lens. As such, the optical signal transmitted from the first optical fiber to the second optical fiber can be viewed on the video monitor.

As the relative position of the two optical fibers may be changed, so too may the optical image detected by the video camera. If the cores of both optical fibers are sufficiently in alignment, then the video camera may visually indicate that light from the optical light source has been coupled only into the core of the second optical fiber. A misalignment between the cores of the two fibers, however, should visually indicate the light coupled into the cladding of the second optical fiber. This method of observing, visually, the coupling at the output of second optical fiber may be advantageous when attempting to splice fibers with on-concentric cores, fiber with guiding pedestal features or dual-clad, cladding pumped fibers. With the apparatus of the present invention, any misalignment or misguiding of the light from the optical light source may be shown in the image observed on the video monitor. Adjustments to the relative position of the two optical fibers can be made until the video image indicates perfect alignment. At this point, fiber fusion splicing may proceed.

The purpose of the machine vision system may be to enable an automated splicing technique employing the principles of the invention. The machine vision system may generally employ a computer outfitted with a video capture card connected to the video camera. The machine vision system may be loaded with a digital representation of the video image obtained when the first and second optical fibers have the desired core alignment. This digital representation may be acquired manually. By use of an appropriate machine vision system, the apparatus may be automated by supplying feedback to the fusion splicer. This feedback signal can be used to provide continuous manipulation of the relative position of first and second optical fibers until the desired coupling is obtained.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. An apparatus for splicing a first and a second optical fiber, each optical fiber having a core, the apparatus comprising:
   a light source for launching an aligning signal through the core of the first optical fiber;
   a control loop for aligning the cores of the first and second optical fibers in response to the aligning signal, the control loop comprising:
      a detector for generating a detecting image in response to detecting the aligning signal propagating through the core of at least one of the optical fibers;
      a machine vision system for generating a manipulation signal in response to the detecting image; and
      a controller for physically aligning the cores of the optical fibers in response to the manipulation signal; and
   a means for splicing the optical fibers in response to the controller physically aligning the cores of the optical fibers.

2. The apparatus of claim 1, wherein at least one of the optical fibers comprises at least one of a non-concentric geometry and a complex mode profile.

3. The apparatus of claim 1, wherein the means for splicing comprises a fusion splicer.

4. The apparatus of claim 1, wherein the detector comprises a lens having a focal point positioned within a free end of second optical fiber.

5. The apparatus of claim 4, wherein the detector comprises at least one of a camera, an image sensor and a charge couple device.

6. The apparatus of claim 1, wherein the controller comprises a robotic tool for performing the physical alignment of one of the optical fibers with respect to the other optical fiber in response to the manipulation signal.

7. The apparatus of claim 1, wherein the means for splicing comprises a fusion splicer that fuses material of the optical fibers together.

* * * * *